(12) United States Patent
Agarwal

(10) Patent No.: US 7,184,170 B2
(45) Date of Patent: Feb. 27, 2007

(54) METHOD AND APPARATUS FOR COLOR MANAGEMENT

(75) Inventor: Niraj Agarwal, Charlotte, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 970 days.

(21) Appl. No.: 10/109,122

(22) Filed: Mar. 28, 2002

(65) Prior Publication Data

US 2003/0184772 A1    Oct. 2, 2003

(51) Int. Cl.
G06K 15/00   (2006.01)
H04N 1/46    (2006.01)

(52) U.S. Cl. ....................... 358/1.9; 358/530
(58) Field of Classification Search ............... 358/1.9, 358/2.1, 500, 525, 515, 530, 3.29, 1.18; 382/162, 382/167, 165
See application file for complete search history.

(56) References Cited

U.S. PATENT DOCUMENTS

| | | | |
|---|---|---|---|
| 4,887,906 A | | 12/1989 | Koehler |
| 5,255,350 A | | 10/1993 | Hermann et al. |
| 5,619,434 A | | 4/1997 | Keating |
| 5,668,633 A | * | 9/1997 | Cheetam et al. ............ 356/402 |
| 5,740,078 A | * | 4/1998 | Cheetam et al. ............ 356/402 |
| 6,282,567 B1 | | 8/2001 | Finch, II et al. |
| 2002/0075501 A1 | * | 6/2002 | Mantell et al. ............ 358/1.14 |
| 2003/0078794 A1 | * | 4/2003 | Knapp ..................... 705/1 |

FOREIGN PATENT DOCUMENTS

| | | |
|---|---|---|
| EP | 0 767 362 A1 | 10/1996 |
| WO | WO 89/09383 A1 | 10/1988 |
| WO | WO 00/63818 | 10/2000 |
| WO | WO 01/40970 A2 | 6/2001 |
| WO | WO 01/41012 | 6/2001 |
| WO | WO 01/79356 A1 | 10/2001 |
| WO | WO 01/86521 | 11/2001 |
| WO | WO 01/97070 | 12/2001 |
| WO | WO 01/97090 A2 | 12/2001 |

OTHER PUBLICATIONS

Search Report and Written Opinion for Singapore Patent Application No. 200405445-8, mail dated Jun. 23, 2005, provided by the Austrian Patent Office as Search and Examination Authority according to the Memorandum of Understanding between the Government of Singapore the Austrian Patent Office.
U.S. Appl. No. 09/883,647, filed Jun. 18, 2001, Sherrill, et al.
X-Rite, TextileMaster, Textile Color Formulation Software Package, Apr. 2000.
X-Rite, Textile-Master Formulation Software, Sample Preparation Guide, Dec. 1995.

* cited by examiner

Primary Examiner—Jerome Grant, II
(74) Attorney, Agent, or Firm—Tod A. Waldrop

(57) ABSTRACT

A color matching system including a database of information describing colorants organized into groups of colorants. A computing device identifies at least one recipe of colorants that can reproduce a desired color by selecting at least one group of colorants, identifying possible recipes using the colorants in the group and selecting a best recipe from the possible recipes based on a recipe cost and a calculated metamerism of the recipe.

22 Claims, 6 Drawing Sheets

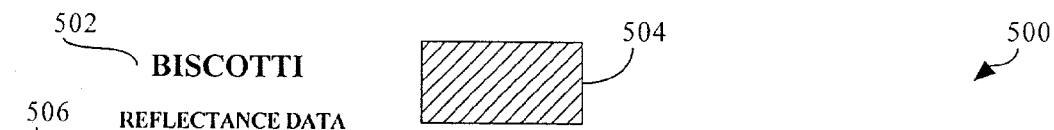

| 502 | BISCOTTI | | 504 | | | | | 500 |
|---|---|---|---|---|---|---|---|---|
| 506 | REFLECTANCE DATA | | | | | | | |
| | 400-470nm | 22.86 | 22.29 | 22.15 | 225.49 | 23.22 | 24.16 | 25.18 | 26.16 |
| | 490-550nm | 27.11 | 28.10 | 29.16 | 30.32 | 31.55 | 32.76 | 34.13 | 36 23 |
| | 560-630nm | 39.42 | 43.01 | 45.65 | 47.00 | 47.58 | 47.67 | 47.43 | 47.33 |
| | 640-700nm | 48 12 | 50.27 | 53 90 | 58.65 | 63.87 | 69.01 | 73.40 | |

| 508 | COTTON RECIPE | |
|---|---|---|
| | DRIMARENE ORANGE X-3LG | 0.177% |
| | DRIMARENE RUBINE X-3LR | 0.0326% |
| | DRIMARENE BLUE X-3LR | 0.0341% |
| | Metamerism in D65 | 0.04% |

| 510 | POLYESTER RECIPE | |
|---|---|---|
| | Yellow Brown EGLN 150 | 0.196% |
| | Nylosan Red EGL 200 | 0.00618% |
| | Nylson Blue E2GL 200 | 0.00952% |
| | Metamerism in D65 | 0.39 |

| 512 | NYLON RECIPE | |
|---|---|---|
| | Foron Yellow SE3GL 200 | 0.0317% |
| | Foron Scarlet E2GFL 150 | 0.0253% |
| | Foron Blue EBL 150 | 0.0121% |
| | Metamerism in D65 | 0.33 |

| 514 | BISCUIT | | 516 | | | | | |
|---|---|---|---|---|---|---|---|---|
| 518 | REFLECTANCE DATA | | | | | | | |
| | 400-470nm | 30.17 | 29.57 | 29.54 | 30.05 | 31.03 | 32.26 | 33.66 | 35.06 |
| | 490-550nm | 36.53 | 38.15 | 39.96 | 41.93 | 44.03 | 46.11 | 48.30 | 50.89 |
| | 560-630nm | 54.04 | 57.20 | 59.38 | 60.47 | 60.90 | 60.94 | 60.73 | 60.69 |
| | 640-700nm | 61.46 | 63.31 | 66.26 | 69.94 | 73.83 | 77.52 | 80.56 | |

| 520 | COTTON RECIPE | |
|---|---|---|
| | DRIMARENE ORANGE X-3LG | 0.0909% |
| | DRIMARENE RUBINE X-3LR | 0.00922% |
| | DRIMARENE BLUE X-3LR | 0.0142% |
| | Metamerism in D65 | 0.11 |

| 522 | POLYESTER RECIPE | |
|---|---|---|
| | Yellow Brown EGLN 150 | 0.117% |
| | Nylosan Red EGL 200 | 0.000911% |
| | Nylson Blue E2GL 200 | 0.00370% |
| | Metamerism in D65 | 0.21 |

| 524 | NYLON RECIPE | |
|---|---|---|
| | Foron Yellow SE3GL 200 | 0.0219% |
| | Foron Scarlet E2GFL 150 | 0.0107% |
| | Foron Blue EBL 150 | .00490% |
| | Metamerism in D65 | .22 |

FIG. 5

METHOD AND APPARATUS FOR COLOR MANAGEMENT

BACKGROUND OF THE INVENTION

Color management is extremely important to many retail industries where sales are often related to the ability of a retailer to offer products in colors that are currently popular. Taking the textile/apparel industry as an example, the popularity of certain colors waxes and wanes seasonally, requiring the retailer to be ever vigilant regarding the color of the products that they offer for sale. Manufacturers, distributors and retailers that offer their own branded products, are continually seeking methods and apparatus to ensure consistency of color in the products that they offer for sale. This starts with the colorants, including pigments and dyes, that are used to color, e.g. dye, the material used in their products. Many manufacturers and retailers are faced with the further task of ensuring color-coordination of products on different materials, such as different fabrics, ceramics, plastics, etc. Compounding the difficulties of such a task, products from different sources have a tendency to behave differently as viewing conditions change, such as, natural daylight versus artificial lighting, or viewing angle. Given that a fairly typical retailer in, for example, the textile/apparel industry, may purchase the same textile/apparel products from ten different vendors in six different countries on three different continents, the time and resources spent on color management becomes significant.

Continuing with our example the textile industry, when purchasing textile products for resale, a provider of textile products, such as a retailer, designer, manufacturer, or distributor (hereinafter simply retailer), creates a specification that may, for example, include: a pattern; a fabric; and a color. The specification is submitted to a textile vendor, such as a cut and sew shop; a fabric mill; a dye house; or some combination thereof. A fundamental step in setting up a manufacturing process for the goods described by the specification is to determine a recipe that will produce the desired color. Typically, a dye house is responsible for matching the color of the fabric requested by the retailer and dyeing the fabric for subsequent assembly of the textile product. To do this, the dye house may use internal resources or consult external resources, such as a colorant manufacturer. Often, the match is not perfect, but instead is an approximation with colorants available to the professional performing the match. A sample produced using the color match is typically passed back to the retailer for approval of the color match.

The end result of the color matching process is a recommended colorant specification typically including a dyestuff formula and a recommended dyeing process. The dyestuff formula is the specific colorants and the blend ratio necessary to obtain, for example, a specific color shade and a specific fastness on a particular substrate. The recommended colorant specification is typically obtained by generating a list of possible formulas, either manually or automatically, which are individually reviewed by a dyeing professional. The dyeing professional selects a single formula based on the needs of the retailer balancing such factors as cost versus fastness and color consistency in different light sources.

Color selection is a time consuming process that has heretofore required a highly experienced dyeing professional to produce acceptable results. As noted above, some automated systems for color matching have been offered. While such systems automate the creation of recipes, they are not currently able to identify a best match. Rather, known commercial system offer a sorted list of possible recipes that must be reviewed by a dyeing professional.

FIG. 1 is a flowchart of a known method for automatically generating a list of possible color matches. The method starts in step 100. In step 102, reflectance data of a desired color is obtained, typically using a spectrophotometer. Next in step 104 an operator selects a set of colorants suitable for the material being dyed. The operator can limit the number of colorants, based on his or her experience, to those most likely to produce a good match. In step 106, the operator identifies certain conditions, to be used in sorting the output. Typically, the operator will identify a light source, a type of material and a dyeing process.

In step 108, the system automatically calculates and matches recipes. Typically, such calculation is performed by generating a list of all possible colorant combinations and iteratively modeling the reflectance characteristics of a color produced by the colorants at various concentrations. Modeling reflectance characteristics is well known. For example one method of performing such modeling is described in *Colour Physics for Industry*, 1987 Society of Dyers and Colourists, Edited by Roderick McDonald. One example of a product capable of performing such modeling is the MATCHWIZARD software available from CLARIANT Corporation.

Thereafter, in step 110, all of the matching recipes are sorted based on the conditions entered in step 106. Next, in step 112, the system outputs all of the matching recipes in matching order. The automated method ends in step 114. The real work now begins. A dyeing professional must be engaged to review the output of the automated method and select a single best colorant recipe that meets expectations.

A dyeing professional may be called on to provide a hundred or more colorant formulas at a time for a single retailer. In the past, this has required weeks of effort analyzing each recipe, selecting a best recipe and preparing a detailed report. With a trend toward color coordination in almost every consumer product, the amount of time and resources being devoted to selecting colorant recipes is becoming significant and is outpacing the availability of dyeing professionals.

For example consider the automotive industry. It is not uncommon for an automaker to want to coordinate matching colors in the interior of an automobile. This requires matching color across a variety of materials, including: plastic, leather, metal, and fabric. Given that each type of material requires different types of colorants, and different dyeing processes, such matching has, in the part, required and extraordinary amount of effort on the parts of designers and color/dyeing professionals.

Yet another example is the athletic shoe industry. The current style in sneakers includes a mix of a variety of different materials, each of which must be dyed so as to match the other materials. It is possible that any given sneaker will contain several, if not all, of the following materials: cotton, polyester, nylon, leather, rubber, metal and plastic. Further, it is not uncommon for other types of products, such as clothing, bags and watches, to be promotionally tied with a sneaker line, presenting additional materials which require dyeing to a predetermined color.

Co-pending U.S. patent application Ser. No. 09/883,647, entitled A PROCESS FOR COLOR MANAGEMENT, incorporated herein by reference, describes the use of an engineered color standard (ECS) by a retailer for controlling a color quality across multiple suppliers. The ECS is created by an ECS provider, such as a dye manufacturer, using color matching software and a profile that identifies "acceptable tradeoffs," e.g., cost versus fastness, color versus light source. Currently, the ECS is created by an experienced dyeing professional selecting the appropriate colorant specification as described above.

The present invention provides improved methods and apparatus that automates much of the selection of a recommended color recipe.

BRIEF DESCRIPTION OF THE DRAWINGS

An understanding of the present invention can be gained from the following detailed description of the invention, taken in conjunction with the accompanying drawings of which:

FIG. 5 is an example of a page of a recipe book produced in accordance with a preferred embodiment of the present invention.

DETAILED DESCRIPTION

Figure 1:
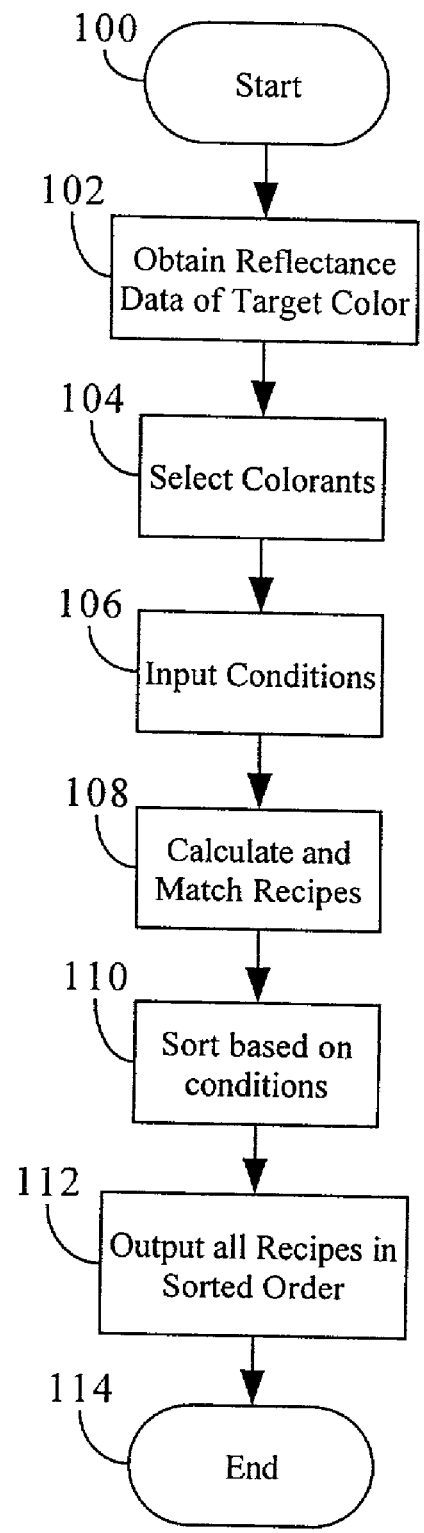
FIG. 1 is a flowchart of a known method for automatically generating a list of possible color matches.

Reference will now be made in detail to the present invention, examples of which are illustrated in the accompanying drawings, wherein like reference numerals refer to like elements throughout.

The detailed description which follows presents methods that may be embodied by routines and symbolic representations of operations of data bits within a computer readable medium, associated processors, networks, and network devices. A routine is here, and generally, conceived to be a sequence of steps or actions leading to a desired result, and as such, encompasses such terms of art as "program," "objects," "functions," "subroutines," and "procedures." These descriptions and representations are the means used by those skilled in the art effectively convey the substance of their work to others skilled in the art.

In general, the sequence of steps in the present methods require physical manipulation of physical quantities. Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

Some of the apparatus set forth in the present application may be specifically constructed for the required purpose, i.e. color matching, but the methods recited herein may operate on a general purpose computer or other network device selectively activated or reconfigured by a routine stored in the computer and interface with the necessary color sensing equipment. More to the point, the methods presented herein are not inherently related to any particular computer system. In particular, various machines may be used with routines in accordance with the teachings herein. On the other hand, it may prove more convenient to construct more specialized apparatus to perform the required method steps. In certain circumstances, when it is desirable that a piece of hardware possess certain characteristics, these characteristics are described more fully in the following text. Machines which may perform the functions of the present invention include those manufactured by such companies as HEWLETT PACKARD, DELL and DATACOLOR as well as other manufacturers of computer and color analysis equipment.

With respect to the software described herein, those of ordinary skill in the art will recognize that there exists a variety of platforms and languages for creating software for performing the procedures outlined herein. The preferred embodiment of the present invention can be implemented using MICROSOFT VISUAL BASIC, however, those of ordinary skill in the art also recognize that the choice of the exact platform and language is often dictated by the specifics of the actual system constructed, such that what may work for one type of system may not be efficient on another system.

Figure 2:
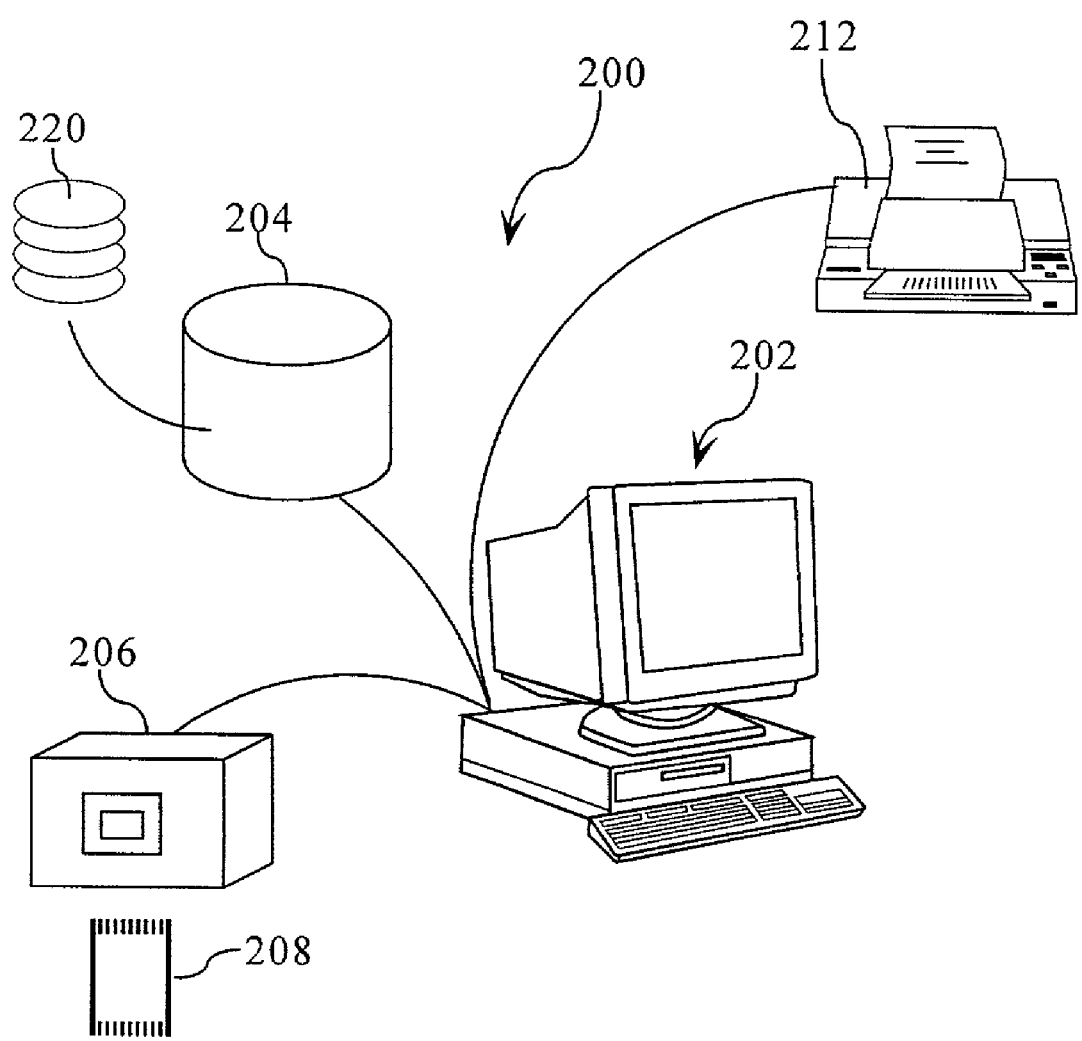
FIG. 2 is a block diagram of a system incorporating an apparatus in accordance with the preferred embodiments of the present invention.

FIG. 2 is a block diagram of a color matching system 200 incorporating an apparatus in accordance with the preferred embodiments of the present invention. The color matching system 200 provides recipe recommendations that incorporate much of the expertise of a dyeing professional. It will be appreciated by those of ordinary skill in the relevant arts that the color matching system 200, as illustrated in FIG. 2, and the operation thereof as described hereinafter is intended to be generally representative such systems and that any particular system may differ significantly from that shown in FIG. 2, particularly in the details of construction and operation of such system. As such, the color matching system 200 is to be regarded as illustrative and exemplary and not limiting as regards the invention described herein or the claims attached hereto.

The color matching system 200 includes a computing device 202, such as any number of personal computers marketed by DELL. The computing device 202 may be any device capable of making the calculations described herein, and could comprise the described personal computer, a handheld computer, a PDA, or a dedicated ASIC device. The computing device 202 typically receives and stores data on a computer readable medium 204, which may be a local storage device, such as a hard disk or CD-ROM, and/or a remote storage device, such as a network storage device. A spectrophotometer 206, such as a DATACOLOR SPECTRAFLASH or a GRETAG/MACBETH COLOREYE, connected to the computing device 202 and analyzes the color of a sample 208 and outputs reflectance values. Any device or combination capable of providing standard reflectance data may be used instead of the spectrophotometer 202. A printer 212, preferably a color printer such as marketed by HEWLETT-PACKARD and XEROX, provides output indicating a recipe recommendation.

To prepare the color matching system 200 for use, a calibration table is prepared that contains reflectance data for each colorant that the user of the system wishes to use in the color matching process. As is understood by those of ordinary skill in the art, there are basically four identifiers that characterize colorants: color, class, material type, and process type. Color is self-explanatory. The colorant class refers to chemical nature of the colorant and, for fabric colorants, may include: vat, sulfur, disperse, reactive, direct, pigment and acid. Material type describes the type of material the colorant works best on and, for fabric colorants, may include: cotton, nylon, polyester, etc . . . The process type describes how the colorant is applied and, for fabric colorants, may include: continuous, printing pad batch, and batch. To prepare a calibration table, for each possible combination of class, fabric type and process type a plurality of samples 208 with different amounts of single colorants at different levels of concentration are prepared and measured by the spectrophotometer 206. Reflectance data for each colorant at each concentration level is stored in a database 210 on the computer readable medium 204.

It is envisioned that a colorant manufacturer or dye house would prepare such a database using samples 208 prepared with each of the colorants it regularly produces and/or uses. Repeating this procedure on different materials, such as various metals leathers, and plastics, may further enhance the database 210. The exact construction and format of the database 210 will depend on the desired implementation of the color management system 200, but is within the ability of one of ordinary skill in the art to construct based on the descriptions contained herein.

In perhaps the preferred embodiment, the calibration database comprises a table for each combination of class, type and process. Each table would contain a plurality of rows storing a colorant name, a concentration level and standard reflectance data at the particular concentration level. The number of concentration levels measured for each colorant is limited only by the time and material available for testing. However, those of ordinary skill in the art will recognize that there are certain standard concentrations levels that encompass the usable color variations for each colorant. It is further preferable to store a cost index for each colorant so as to permit an estimation of the relative cost of any given recipe.

From the calibration database, groups of colorants are defined. In perhaps the preferred embodiment, the groups are created based on a depth of shades that can be defined with the colorants in the group. More specifically, an experienced colorist could select all the colorants that can be used for a specified application and material type. Then the colorist would divide the colorants into colorant groups that are suitable for pale, medium or dark colors. The colorist selects the colorants to be used for a certain depth of shade based on a multiplicity of factors. For example, pale shades for apparel fabric can be selected to achieve a high light fastness and good dye migration properties resulting, hopefully, in a uniform dyeing. Colorant cost and high wash fastness may not be an important consideration in this case. On the other hand, for dark, high wash fastness and economy may of paramount importance. Special requirements such as stability to temperature and pH may also guide the colorant selection depending on the application and material to be colored.

In accordance with a preferred embodiment of the present invention, the colorant groups are collected into series and prioritized. Typically, the first prioritized colorant group will comprise a trichromie combination (yellow+red+blue colorant) that is most suited and economical for that particular depth of shade. Successive groups will add more colorants to expand the color gamut and perhaps provide more options for reducing metamerism achieving a better color match under multiple ruminants). Colorants that are not preferred, for example due to reasons of poor dyeing behavior or low fastness, will generally be present in the last colorant group such that these colorants are used for matching only if absolutely necessary. The use of prioritized colorant groups provides a useful mechanism to incorporate the know-how of an experienced colorist. The product selection logic, while based on multiple factors, can be represented in a compact yet flexible manner using prioritized colorant groups for different applications along with the color matching method outlined below.

Following is an example of grouping for colorants of the acid class for nylon using the exhaust process for apparel applications. Those of ordinary skill in the art will recognize that the following tables are but one example of a data structure that can capture the grouping of colorants in accordance with the preferred embodiment of the present invention.

TABLE 1

GROUPS

| Group | Name |
|---|---|
| 1 | Pale Shades Ternary |
| 2 | Pale Shade Metamerism |
| 3 | Pale Shades Brilliance |
| 4 | Medium Shades Ternary |
| 5 | Medium Shades Metamerism |
| 6 | Medium Shades Economy |
| 7 | Medium Shades Brilliance 1 |
| 8 | Medium Shades Brilliance 2 |
| 9 | Dark Shades Ternary |
| 10 | Dark Shades Metamerism 1 |
| 11 | Dark Shades Metamerism 2 |
| 12 | Dark Shades Brilliance 1 |
| 13 | Dark Shades Brilliance 2 |
| 14 | Turquoise/Brilliant Green |

TABLE 2

GROUP 1 Pale Shades Ternary

| 1 | Acid Yellow 256 |
|---|---|
| 2 | Acid Red Mix |
| 3 | Acid Blue 324 |

TABLE 3

GROUP 2 Pale Shade Metamerism

| 1 | Acid Yellow 256 |
|---|---|
| 2 | Acid Red Mix |
| 3 | Acid Violet 126 |
| 4 | Acid Blue 324 |
| 5 | Acid Blue 40 |

TABLE 4

GROUP 3 Pale Shades Brilliance

| 1 | Acid Yellow 49 |
|---|---|
| 2 | Acid Yellow 256 |
| 3 | Acid Yellow 199 |
| 4 | Acid Red Mix |
| 5 | Acid Violet 126 |
| 6 | Acid Blue 278 |
| 7 | Acid Blue 324 |
| 8 | Acid Blue 40 |

TABLE 5

GROUP 4 Medium Shades Ternary

| 1 | Acid Orange 67 |
|---|---|
| 2 | Acid Red 336 |
| 3 | Acid Blue 350 |

TABLE 6

GROUP 5 Medium Shades Metamerism

| | |
|---|---|
| 1 | Acid Yellow 218 |
| 2 | Acid Orange 67 |
| 3 | Acid Red 336 |
| 4 | Acid Blue 278 |
| 5 | Acid Blue 350 |
| 6 | Acid Blue 280 |
| 7 | Acid Green 25 |

TABLE 7

GROUP 6 Medium Shades Economy

| | |
|---|---|
| 1 | Acid Yellow 218 |
| 2 | Acid Orange 67 |
| 3 | Acid Orange 127 |
| 4 | Acid Red 336 |
| 5 | Acid Red 119 |
| 6 | Acid Red 299 |
| 7 | Acid Blue 113 |
| 8 | Acid Blue 350 |
| 9 | Acid Blue 280 |
| 10 | Acid Green 25 |

TABLE 8

GROUP 7 Medium Shades Brilliance 1

| | |
|---|---|
| 1 | Acid Yellow 218 |
| 2 | Acid Orange 67 |
| 3 | Acid Red 111 |
| 4 | Acid Red 336 |
| 5 | Acid Red 119 |
| 6 | Acid Violet 54 |
| 7 | Acid Violet 48 |
| 8 | Acid Blue 278 |
| 9 | Acid Blue 113 |
| 10 | Acid Blue 350 |
| 11 | Acid Blue 280 |
| 12 | Acid Green 25 |

TABLE 9

GROUP 8 Medium Shades Brilliance 2

| | |
|---|---|
| 1 | Acid Yellow 218 |
| 2 | Acid Yellow 236 |
| 3 | Acid Red 111 |
| 4 | Acid Red Mix |
| 5 | Acid Violet 54 |
| 6 | Acid Violet 48 |
| 7 | Acid Blue 225 |
| 8 | Acid Blue 350 |
| 9 | Acid Blue 280 |
| 10 | Acid Green 40 |
| 11 | Acid Green 81 |

TABLE 10

GROUP 9 Dark Shades Ternary

| | |
|---|---|
| 1 | Acid Yellow Mix |
| 2 | Acid Red 315 |
| 3 | Acid Black Mix |

TABLE 11

GROUP 10 Dark Shades Metamerism 1

| | |
|---|---|
| 1 | Acid Yellow 235 |
| 2 | Acid Yellow Mix |
| 3 | Acid Red 315 |
| 4 | Acid Red Mix |
| 5 | Acid Blue Mix |
| 6 | Acid Brown Mix |
| 7 | Acid Black Mix |

TABLE 12

GROUP 11 Dark Shades Metamerism 2

| | |
|---|---|
| 1 | Acid Yellow 235 |
| 2 | Acid Yellow Mix |
| 3 | Acid Red 315 |
| 4 | Acid Red Mix |
| 5 | Acid Blue Mix |
| 6 | Acid Blue Mix |
| 7 | Acid Brown Mix |
| 8 | Acid Black Mix |

TABLE 13

GROUP 12 Dark Shades Brilliance 1

| | |
|---|---|
| 1 | Acid Yellow Mix |
| 2 | Acid Red 315 |
| 3 | Acid Red Mix |
| 4 | Acid Blue Mix |
| 5 | Acid Yellow Mix |
| 6 | Acid Red Mix |
| 7 | Acid Blue Mix |

TABLE 14

GROUP 13 Dark Shades Brilliance 2

| | |
|---|---|
| 1 | Acid Red 111 |
| 2 | Acid Red -- |
| 3 | Acid Red 128 |
| 4 | Acid Violet 48 |
| 5 | Acid Blue 225 |
| 6 | Acid Blue 127:1 |
| 7 | Acid Blue 280 |
| 8 | Acid Green 40 |
| 9 | Acid Green 81 |
| 10 | Acid Yellow Mix |
| 11 | Acid Red 315 |
| 12 | Acid Red Mix |
| 13 | Acid Blue Mix |
| 14 | Acid Yellow Mix |
| 15 | Acid Red Mix |
| 16 | Acid Blue Mix |
| 17 | Acid Orange 168 |

TABLE 15

GROUP 14 Turquoise/Brilliant Green

| | |
|---|---|
| 1 | Acid Yellow 218 |
| 2 | Acid Blue 278 |
| 3 | Acid Blue 350 |
| 4 | Acid Blue 280 |
| 5 | Acid Green 25 |
| 6 | Acid Green 81 |
| 7 | Direct Blue 86 |

Some colorants are such that two of them cannot be present in a colorant recipe at the same time. This may be due to chemical incompatibilities or difficulty in achieving a uniform coloration. Even with the use of prioritized colorant groups it is not always possible to form groups that avoid such combinations. Accordingly, it is preferably to create a list of incompatible colorants. This list can be created as a table and stored with, or as part of, the database 110. TABLE 16 is an example of a portion of such a table

TABLE 16

INCOMPATABLE DYES (PORTION)

| | |
|---|---|
| Acid Violet 48 | Acid Orange 127 |
| Acid Violet 48 | Acid Blue 280 |
| Acid Violet 48 | Acid Green 25 |
| Acid Violet 48 | Acid Blue 113 |
| Acid Violet 48 | Acid Yellow 236 |
| Acid Violet 48 | Acid Red 111 |
| Acid Blue 225 | Acid Yellow 49 |
| Acid Blue 225 | Acid Yellow 256 |
| Acid Blue 225 | Acid Yellow 199 |
| Acid Blue 225 | Acid Violet 126 |
| Acid Blue 225 | Acid Blue 324 |
| Acid Blue 127:1 | Acid Blue 324 |
| Acid Blue 127:1 | Acid Blue 40 |
| Acid Blue 127:1 | Acid Red 111 |
| Acid Blue 127:1 | Acid Red 143 |
| Acid Green 40 | Acid Yellow 49 |
| Acid Green 40 | Acid Yellow 256 |
| Acid Green 40 | Acid Yellow 199 |
| Acid Green 40 | Acid Violet 126 |
| Acid Green 40 | Acid Blue 324 |
| Acid Blue Mix | Acid Orange 168 |
| Acid Red Mix | Acid Orange 168 |
| Acid Brown Mix | Acid Orange 168 |
| Acid Blue Mix | Acid Orange 168 |
| Acid Black Mix | Acid Orange 168 |
| Acid Yellow Mix | Acid Red Mix |
| Acid Yellow Mix | Acid Brown Mix |
| Acid Yellow Mix | Acid Blue Mix |
| Acid Yellow Mix | Acid Black Mix |
| Acid Red Mix | Acid Brown Mix |
| . . . | . . . |

When a colorant group contains more than three colors it is possible that more than one colorant recipe from that group will match a target color. The present inventors have determined that selecting a recipe by recipe cost or metamerism alone does not provide a good representation of the recipe selection technique of a colorant expert. In accordance with the preferred embodiment of the present invention, cost and metamerism are combined into a single metric: an "adjusted cost". One example of how to calculate an adjust cost is provided below with respect to FIG. 4, however, those of ordinary skill in the art will recognize that the exact form of the adjusted cost objective function is preferably pre-defined by interactive trial and error with a real life colorant expert.

Figure 3:
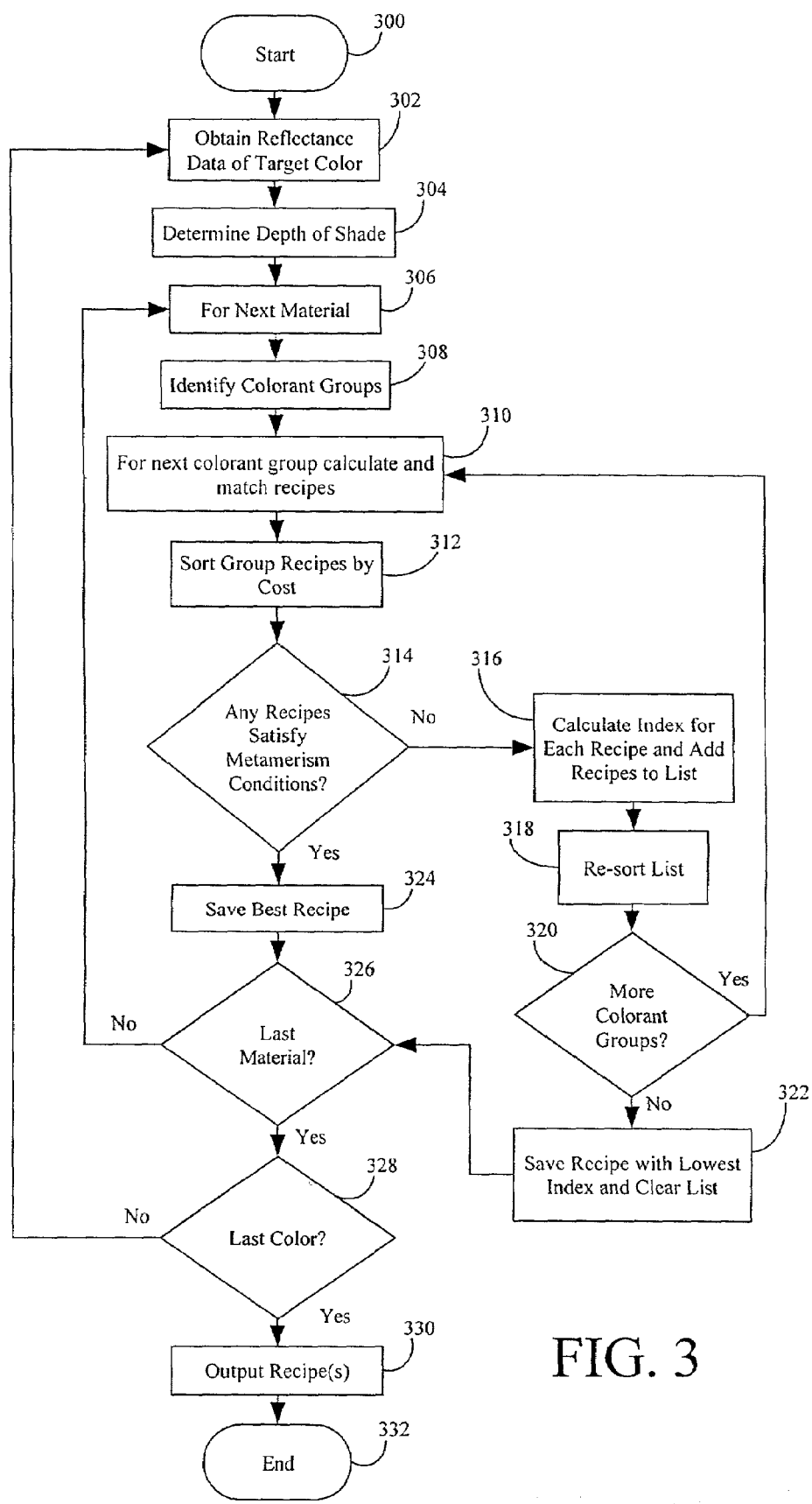
FIG. 3 is a flow chart of a method in accordance with a preferred embodiment of the present invention.

FIG. 3 is a flow chart of a method in accordance with a preferred embodiment of the present invention. As noted above, the methods taught herein may be embodied in routines executed by the computing device 202 (see FIG. 1). The method is started in step 300. In step 302, user input is obtained. This will typically comprise: reflectance data for the color to be matched; the colorant class; the fabric; the dyeing process and maximum metamerism values (typically referred to as DE). The color to be matched may be measured on the spectrophotmer 206 (see FIG. 1) or provided as a file by a retailer, distributor, etc . . . Preferably, the DE values (e.g. a quantification of the color difference) for three different light sources ($DE_1$, $DE_2$, and $DE_3$) are obtained.

Next in step 302, the depth of shade for the color is identified using the reflectance values along with standard depth scales. Typically, a formula such as $\Sigma k/s$ is used to provide a numerical indication of the depth of the sample that is compared to a table to determine a depth, such as 1/12, 1/6, 1/3, 1/1, and 2/1. In accordance with a preferred embodiment of the present invention, the sample is classified as a light, medium or deep shade.

A loop is started in step 306 cycling the subsequent steps for each material that the user wishes to obtain a suggested recipe. In step 308, colorant groups that can produce the particular depth of shade are selected. Preferable, this is accomplished by selecting the set of tables that correspond to the calculated depth and the inputted class, fabric and process.

A loop is started in step 310 cycling the subsequent steps for each group of colorants. The first time through the loop, at step 310, the possible recipes for highest priority colorant group, typically the trichrome group, are calculated using conventional color matching methods using the calibration data. As set forth above, this is typically performed by generating a list of all possible colorant combinations and iteratively modeling the reflectance characteristics of a color produced by the colorants various concentrations of the colorants. At this time the metamerism ($DE_1$, $DE_2$, and $DE_3$) and cost of each recipe is also calculated and stored with the matching recipes. It is preferable to filter out undesirable recipes using the incompatible colorants table (see Table 16). It may also be preferable to filter out recipes displaying an unacceptable level of metamerism. For this calculation it is acceptable to only consider $DE_1$. In any subsequent iteration, the remaining groups for the class, fabric, process, depth are analyzed in group order.

In step 312, the remaining recipes in the group under study are sorted by cost. In step 314 the metamerism values ($DE_1$, $DE_2$, and $DE_3$) are analyzed, in cost order, to determine whether any recipe from the group satisfies the user inputted metamerism conditions. If, in step 314, the metamerism values for one of the recipes is less than the user inputted values, the recipe is accepted as the best recipe and the loop is terminated at this point by going to step 324 and saving the best recipe. By analyzing in cost order, if more than one recipe satisfies the metamerism requirements, the recipe with the least cost is selected.

If all of the recipes from the colorant group being analyzed have "too high" a metamerism, the method goes to step 316 and an adjusted cost index is calculated for each recipe from the group and the recipes along with their adjusted cost indexes are added to a list. The calculation of the adjusted cost index is discussed hereinafter with respect to FIG. 4. Subsequently the list is resorted in step 318.

In step 320, a determination is made as to whether there are any more colorant groups to be analyzed. If there are such groups, the method loops back to step 310 and the next colorant group is analyzed. If a match is found in step 314, that match is selected as the best recipe, otherwise the adjusted cost index is calculated for the recipes from the next group, which are added to the list which is then resorted. Assuming that no recipe from any of the groups satisfies the user inputted metamerism values, the recipe with the lowest index value is saved as the best recipe in step 322 and the list is cleared.

Once an appropriate recipe is identified, either in step 324 or step 322, the method proceeds to step 326 and a check is made to determine whether the users has requested an analysis for any additional material, for example cotton, nylon, polyester, polypropylene, leather. If additional materials have been requested the method returns to step 306 and a new material is selected. Once all materials have been analyzed, the method goes to step 328 to determine whether the user has requested an analysis for any additional colors. If additional colors have been requested, the method returns to step 302 for obtaining additional user input, from for example a file, in the case of batch processing, or directly from the user, in the case of interactive processing.

The method will continue to loop forming a recipe palette of colors and materials. Once all colors and materials have been analyzed, the saved best recipes may be used to create a variety of outputs in step 330. Example of useful outputs are given hereinbelow. Finally, the method ends in step 332.

Figure 4:
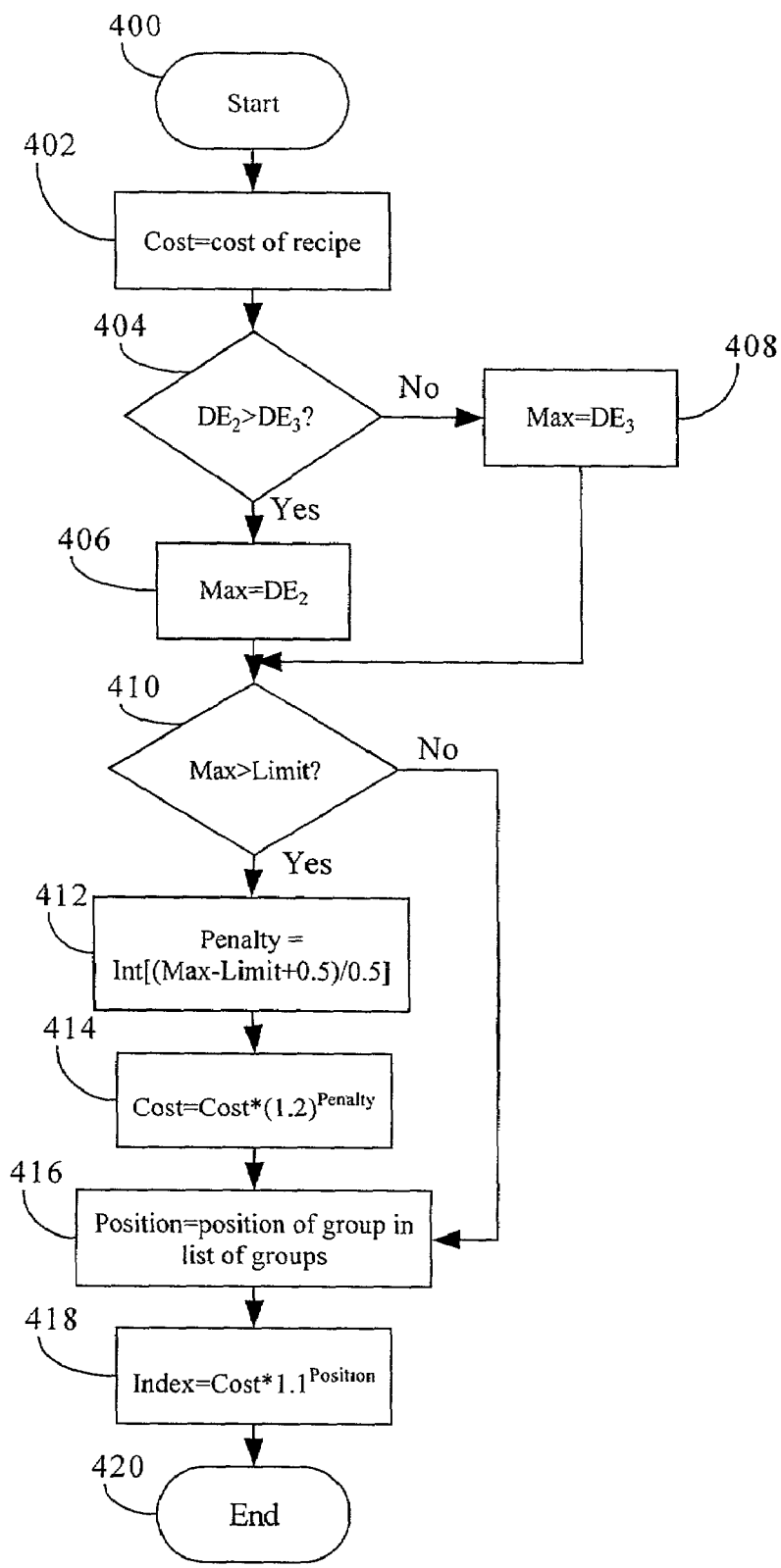
FIG. 4 is a flow chart of a method in accordance with a preferred embodiment of the present invention.

FIG. 4 is a flow chart of a method in accordance with a preferred embodiment of the present invention. The method shown in FIG. 4 calculates an adjusted cost index for a recipe that penalizes the recipe based on metamerism and grouping. Those of ordinary skill in the art will recognize that other methods could be used to arrive at an index value. For example, other factors could be used to create the index, such as color fastness and the number of colorants in the recipe.

The method starts in step 400. In step 402 a variable Cost is set equal to the cost of the recipe as determined in step 310 in FIG. 3. Next, in step 404, a determination is made as to whether $DE_2$ is greater than $DE_3$. If $DE_2$ is greater, then the method proceeds to step 406 and the variable Max is set to $DE_2$, otherwise the method proceeds to step 408 and Max is set to $DE_3$. In either event, the method next proceeds to step 410 and a determination is made as to whether Max is greater than Limit, a value set based on user input regarding metamerism.

If Max is greater than limit a penalty is assigned to the cost of the recipe in steps 412 and 414. In step 412, a variable Penalty is set to the integer of: Max minus Limit plus 0.5 all divided by 0.5. Next in step 414, Cost is set equal to Cost times 1.2 raised to the value of Penalty.

Regardless of whether Max was greater than limit, a variable Position is set equal to the position of the group under scrutiny within the set of groups (as identified in step 308 in FIG. 3) in step 416. Subsequently, in step 418, a variable Index is calculated by multiplying Cost by 1.1 raised to the value of Position. The method ends in step 420.

FIG. 5 is an example of a page 500 of a recipe book that may be outputted in step 330 of FIG. 3. The page 500 presents data for two entries, Biscotti 502 and Biscuit 514. Each entry is provided with a color sample, sample 504 for Biscotti and sample 516 for Biscuit. Each entry is further provided with a reflectance table, table 506 for Biscotti and table 516 for Biscuit, that describe the color's reflectance properties at different wavelengths. In the example shown in FIG. 5, the user requested recipes for three different materials, cotton, polyester, and nylon. Accordingly, three recipes 508–512 are provided for Biscotti and three recipes 520–524 are provided for Biscuit. Those of ordinary skill in the art will recognize that the page 500 could be organized by factors other than color, such as material. By automating the production of a recipe book, a task that one took up to a week is reduced to an afternoon or less.

Figures 6A, 6B:
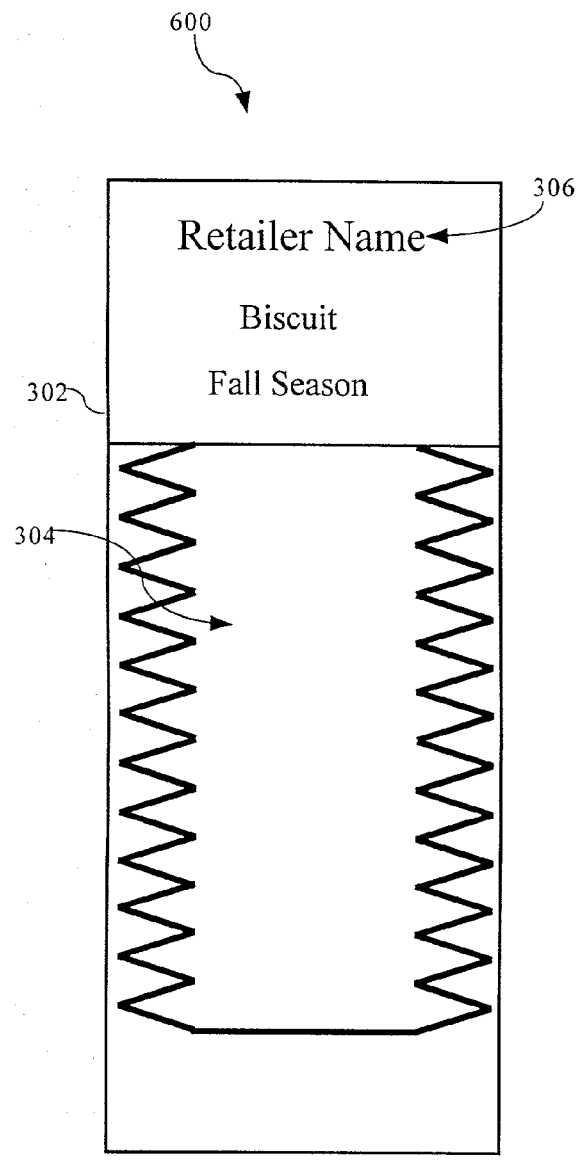
FIGS. 6A and 6B are examples of a swatch produced in accordance with a preferred embodiment of the present invention.

FIG. 6 is an example of a swatch 600 produced in accordance with a preferred embodiment of the present invention. The swatch 600 preferably comprises a backing 302, printed on printer 212, folded over a sample of the dyed cloth 304. The portion of the backing 302 folded over the sample 304 is preferably marked with identifying information 306 such as a retailer's name, a color name, and some form of date or product line indication. On the reverse of the backing 302, reflectance data 308 may be given along with a recipe 310.

By creating a plurality of swatches 600 for each color and fabric combination desired, a retailer or distributor can simplify the color matching process by providing the manufacturer of its goods with a definite recipe that, if followed, will produce goods having the correct color and metamerism. By automating the selection of a recipe, the production of swatches 600 and recipe books can be accomplished in a matter of hours, producing superior results compared to the known methods which can require weeks and months.

One preferred method of delivery for the swatches 600 and recipe books is via the now ubiquitous World Wide Web. The computing device 202 (or other computer device such as any number of servers provided by SUN MICROSYSTEMS) can be used to store and serve WWW pages, typically formatted in HTML, providing a catalog (typically using thumbnail images) of the various colors available. Using any number of available CGI's the computing device can receive and process orders for the swatches 600 and recipe books. The color matching system 200 can be used to automatically populate the data tables for such a web site, thereby achieving a level of automation not previously available.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A color matching system comprising:
a database of information describing colorants, the database being organized into groups of colorants, wherein the groups of colorants are associated with a production method and/or the standard depth of the color standard; and
a computing device that calculates at least one recipe of colorants that can reproduce a desired color by selecting at least one group of colorants, identifies possible recipes using the colorants in the group and selects a best recipe from the possible recipes based on a recipe cost and a calculated metamerism of the recipe.

2. A color matching system comprising:
a database of information describing colorants, the database being organized into groups of colorants:
and a computing device
wherein the computing device comprises:
a CPU; and
a program That causes the CPU to execute the following actions:
receive reflectance data for the desired color;
determine a shade of the desired color;
identifies a group in the database based on the shade of the desired color;
calculates a plurality of recipes using the colorants in the color group;
determines a metric for the created recipes based on recipe cost and recipe metamerism; and
identifies one of the created recipes as a best recipe based on the metric.

3. The color matching system, according to claim 2, wherein the computing device identifies at least a first recipe for use with a first material and a second recipe for use with a second material.

4. The color matching system, according to claim 2 wherein the computing device creates a variety of outputs of the best recipe.

5. The color matching system, as set forth in claim 4, wherein the computing device identifies at least a first recipe for a first desired color for use with a first material, a second recipe for the first desired color for use with a second material, a third recipe for a second desired color for use on the first material, and a fourth recipe for the second desired color for use on the second material, the computing device further causing the printer to output the first, second, third and fourth recipes organized by material or color.

6. The color matching system, according to claim 2, wherein the computing device calculates a best recipe for the desired color for each of a plurality of materials.

7. The color matching system, according to claim 2, wherein the computing device calculates a best recipe for a plurality of desired colors.

8. The color matching system, according to claim 2, wherein the computing device calculates a best recipe for a plurality of desired colors on a plurality of materials.

9. The color matching system, as set forth in claim 8, wherein the computing device operates in a batch mode.

10. A color matching system comprising:
   a database of information describing colorants, the database being organized into groups of colorants, wherein the database is organized into groups based on a color of the colorant, a class of the colorant a fabric upon which the colorant is to be used, and a process for dyeing; and
   a computing device that calculates at least one recipe of colorants that can reproduce a desired color by selecting at least one group of colorants, identifies possible recipes using the colorants in the group and selects a best recipe from the possible recipes based on a recipe cost and a calculated metamerism of the recipe.

11. The color matching system, as set forth in claim 10, wherein the groups are further based on a shade that can be produced with the colorant.

12. A color matching system comprising:
   a database of information describing colorants, the database being organized into groups of colorants, wherein the groups of colorants are associated with a production method and/or the standard depth of the color standard; and
   a computing device that calculates at least one recipe of colorants that can reproduce a desired color by selecting at least one group of colorants, identifies possible recipes using the colorants in the group and selects a best recipe, wherein the computing device selects the best recipe by determining if any of the identified recipes meets metamerism conditions set by the user and if such recipes exists, selects the recipe with the least cost.

13. The color matching system, as set forth in claim 12, wherein if none of the identified recipes meets the metamerism conditions, the computing device selects the best recipe by calculating an adjusted cost index and selects the recipe with the best adjusted cost index as the matching recipe.

14. The color matching system, as set forth in claim 13, wherein the adjusted cost index penalizes recipes based on a priority of the group from which the recipe is created.

15. The color matching system, as set forth in claim 13, wherein the adjusted cost index penalizes recipes based on user inputted metamerism value.

16. A color management system for identifying a colorant recipe for producing a desired color on a desired medium, the color management system comprising:
   computer processor means for processing data;
   storage means for storing data on a storage medium;
   first means for identifying one group from among a plurality of groups of colorants that should be able to produce the desired color on the desired medium;
   second means for creating a colorant recipe using the colorants in the identified group of colorants that closely matches the desired color on the desired medium;
   third means for determining a metric for the created recipe based on recipe cost and recipe metamerism;
   fourth means for identifying the created recipe as the identified colorant recipe if the metric has a predetermined relationship with a user provided input;
   fifth means for organizing a series of identified colorant recipes based on the color produced by each colorant recipe and the material upon which each colorant recipe is to be used; and
   sixth means for creating a variety of outputs about the series of identified colorant recipes.

17. A method of color management comprising:
   identifying one group from among a plurality of groups of colorants that should be able to produce a desired color on the desired medium;
   creating a recipe using the colorants in the identified group of colorants that closely matches the desired color on the desired medium;
   determining a metric for the created recipe based on recipe cost and recipe metamerism; and
   identifying the created recipe as the identified colorant recipe if the metric has a predetermined relationship with a user provided input.

18. A method of producing engineered color standard comprising;
   receiving reflectance data regarding a desired color;
   determining a depth of shade of the desired color;
   identifying at least one group of colorants associated with the depth of shade;
   automatically identifying a single recipe using the colorants in the at least one group of colorants that can produce the desired color on a desired material; and
   creating a variety of outputs of the recipe.

19. A method of determining a colorant recipe for each of a plurality of materials, the method comprising:
   receiving an indication of a desired color and a plurality of desired materials;
   for each desired material:
      calculating at least one colorant recipe, using stored information about colorants, that closely matches the desired color on the desired material;
      determining an index based on desired characteristics of the desired material as dyed by the calculated colorant recipe; and
      identifying a calculated recipe as a colorant recipe if the index has a predetermined relationship with a user provided input; and
   for each material for which a colorant recipe was identified outputting an indication of the material and the colorant recipe.

20. A method of producing engineered color standard comprising:
   receiving reflectance data regarding a desired color;
   determining a depth of shade of the desired color;
   identifying at least one group of colorants associated with the depth of shade;
   automatically identifying a single recipe using the colorants in the at least one group of colorants that can produce the desired color on a desired material; and
   printing the recipe.

21. The method of claim 20 wherein the step of printing comprises:
   printing the recipe on a card.

22. The method of claim 21 further comprising:
   attaching a sample of material to the card.

* * * * *